(12) United States Patent
Kanjirathinkal et al.

(10) Patent No.: US 11,726,537 B2
(45) Date of Patent: Aug. 15, 2023

(54) DYNAMIC LOAD BALANCING ACROSS POWER SUPPLY UNITS

(71) Applicant: Dell Products L.P., Round Rock, TX (US)

(72) Inventors: Joseph G. Kanjirathinkal, Cary, NC (US); Pramod Kumar Puthanveettil Kurungodan, Bangalore (IN); Peniel Charles, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 15 days.

(21) Appl. No.: 17/466,416

(22) Filed: Sep. 3, 2021

(65) Prior Publication Data
US 2022/0404885 A1  Dec. 22, 2022

(30) Foreign Application Priority Data
Jun. 22, 2021  (IN) .............................. 202111028013

(51) Int. Cl.
*G06F 1/26* (2006.01)
*G06F 1/28* (2006.01)
*H02J 9/06* (2006.01)
*G06F 1/3228* (2019.01)
*G06F 1/30* (2006.01)

(52) U.S. Cl.
CPC .............. *G06F 1/263* (2013.01); *G06F 1/28* (2013.01); *G06F 1/30* (2013.01); *G06F 1/3228* (2013.01); *H02J 9/068* (2020.01)

(58) Field of Classification Search
CPC ... G06F 1/263; G06F 1/28; G06F 1/30; G06F 1/3228; H02J 9/068
See application file for complete search history.

(56) References Cited

U.S. PATENT DOCUMENTS

| | | | |
|---|---|---|---|
| 8,037,330 B2 | 10/2011 | Livescu et al. | |
| 9,164,557 B1 * | 10/2015 | Marr | G06F 1/28 |
| 9,218,033 B1 * | 12/2015 | Roy | G06F 1/26 |
| 10,847,994 B2 * | 11/2020 | Mohan | H02J 1/14 |
| 11,048,311 B1 * | 6/2021 | Churnock | G06F 1/28 |
| 2005/0071092 A1 * | 3/2005 | Farkas | H02J 3/14 |
| | | | 702/60 |
| 2009/0282274 A1 * | 11/2009 | Langgood | H02J 3/14 |
| | | | 713/320 |
| 2009/0307514 A1 * | 12/2009 | Roberts | G06F 1/3203 |
| | | | 713/330 |

(Continued)

*Primary Examiner* — Aurel Prifti
(74) *Attorney, Agent, or Firm* — Larson Newman, LLP

(57) ABSTRACT

A power supply manager manages power utilization of a first uninterruptible power source and a second uninterruptible power source. A load balancing service retrieves information that is associated with a first power supply unit and a second power supply unit, and determines a first power source state associated with the first uninterruptible power source and a second power source state associated with the second uninterruptible power source. The service may also set the first power supply unit in an active mode based on the first power source state, and set the second power supply unit in a standby mode based on the second power source state. The service may also transition the first power supply unit from the active mode to standby mode, and the second power supply unit from standby mode to the active mode, based on a power imbalance.

20 Claims, 5 Drawing Sheets

(56) References Cited

U.S. PATENT DOCUMENTS

| | | | |
|---|---|---|---|
| 2010/0038963 A1* | 2/2010 | Shetty | G06F 1/263 307/62 |
| 2010/0058091 A1* | 3/2010 | Lambert | G06F 1/263 713/330 |
| 2010/0100756 A1* | 4/2010 | Rahardjo | G06F 1/28 713/330 |
| 2011/0191618 A1 | 8/2011 | Berke et al. | |
| 2013/0138365 A1* | 5/2013 | Etaati | G01R 31/40 702/58 |
| 2014/0277810 A1* | 9/2014 | Costa | G06F 1/263 700/297 |
| 2015/0074431 A1* | 3/2015 | Nguyen | G06F 1/30 713/300 |
| 2015/0177813 A1* | 6/2015 | Bailey | G06F 1/3234 713/320 |
| 2015/0261272 A1* | 9/2015 | Munjal | H05K 7/1492 713/300 |
| 2015/0316970 A1* | 11/2015 | Chadha | G06F 1/3234 713/300 |
| 2017/0357305 A1* | 12/2017 | Kunnathur Ragupathi | G06F 1/3206 |
| 2018/0059765 A1* | 3/2018 | Km | G06F 1/3206 |
| 2018/0113503 A1* | 4/2018 | Sterns | H05K 7/1498 |
| 2019/0350105 A1* | 11/2019 | Belady | H02J 9/061 |
| 2020/0076628 A1* | 3/2020 | Yam | G06F 1/28 |
| 2020/0133365 A1 | 4/2020 | Muccini et al. | |
| 2020/0142465 A1* | 5/2020 | Jenne | G06F 1/28 |
| 2021/0351609 A1* | 11/2021 | Chen | H02J 1/084 |
| 2022/0129601 A1* | 4/2022 | Kar | G06F 1/263 |
| 2022/0329149 A1* | 10/2022 | Fong | H02M 1/4208 |

\* cited by examiner

DYNAMIC LOAD BALANCING ACROSS POWER SUPPLY UNITS

FIELD OF THE DISCLOSURE

The present disclosure generally relates to information handling systems, and more particularly relates to dynamic load balancing across power supply units.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A power supply manager manages power utilization of a first uninterruptible power source and a second uninterruptible power source. A load balancing service retrieves information that is associated with a first power supply unit and a second power supply unit, and determines a first power source state associated with the first uninterruptible power source and a second power source state associated with the second uninterruptible power source. The service may also set the first power supply unit in an active mode based on the first power source state, and set the second power supply unit in a standby mode based on the second power source state. The service may also transition the first power supply unit from the active mode to standby mode, and the second power supply unit from standby mode to the active mode, based on a power imbalance.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
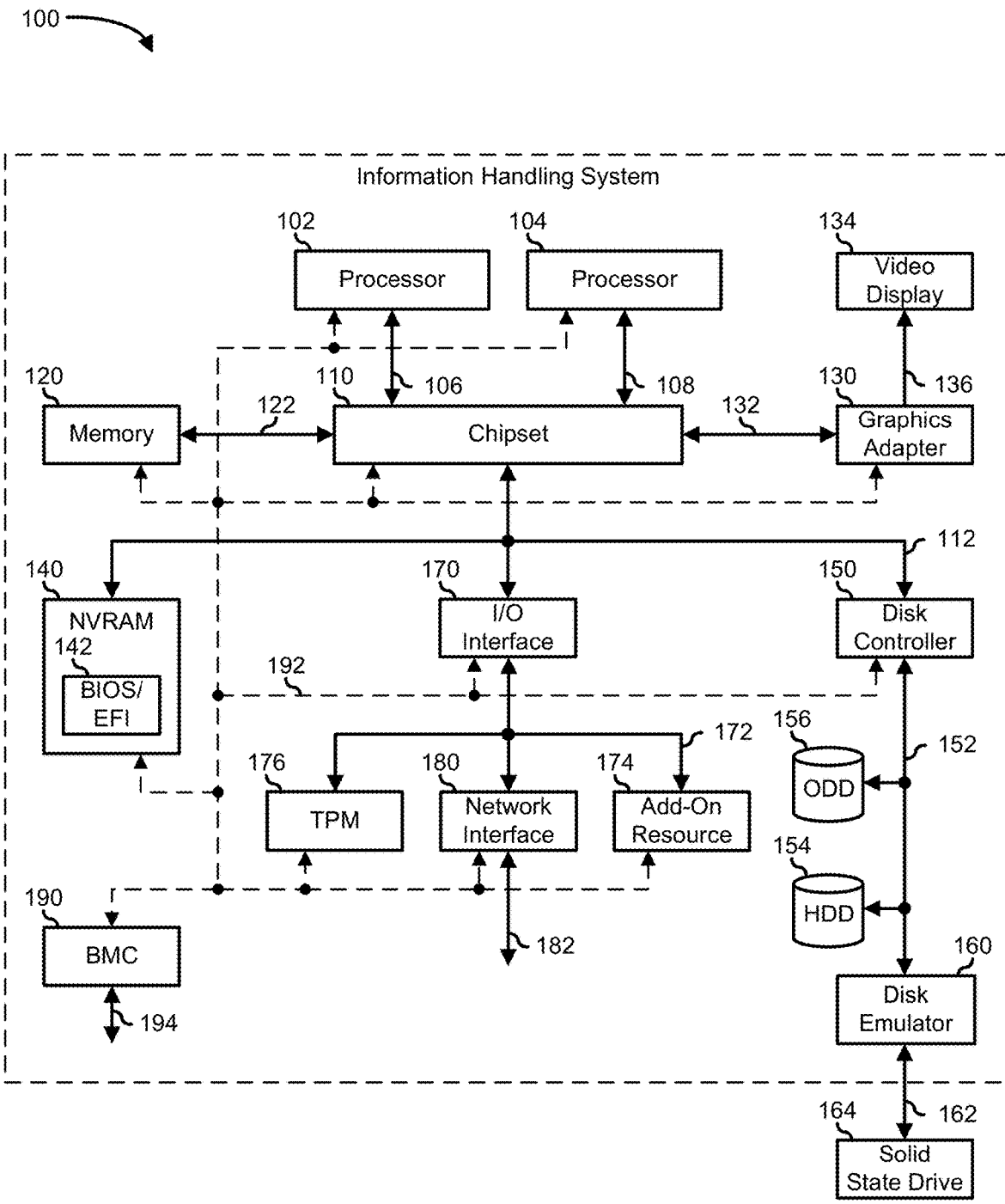
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Typically servers, also referred to herein as server nodes or simply nodes, in a datacenter utilize a dual power supply unit (PSU) with a hot spare feature for redundancy. When the hot spare feature is enabled, one of the redundant PSUs is switched into a standby state or sleep state when system utilization is low to maximize efficiency. This may only be performed if the load on the PSU in the active mode is over a threshold. The threshold may be a certain percentage of a rated power percentage of the PSU. When the load on the active PSU is over the threshold, the PSU on standby becomes active.

However, because the hot spare feature configuration of the active PSU and the standby PSU is static, the servers typically use one PSU until the roles of the PSUs are changed manually. If the hot spare feature is disabled, then the PSUs are not assigned to either the active or standby power supply role, and all of the PSUs will be serving power to the servers. Thus, the PSUs will not be used optimally. In addition, the power demands of the server may change based on various factors such as their input/output load, CPU utilization, heat generated, etc. The changing power demand of the servers can lead to an imbalance in the UPS units and lead to power trips in the data center that may cause the servers to fail and affect access to storage data by customers resulting in decreased reliability. Because of the above and other concerns, it is desirable to understand the actual power load distribution and use the information for effective power load balancing of the uninterruptible power source (UPS) units increasing the reliability of the servers and availability of data for the customers.

Figure 2:
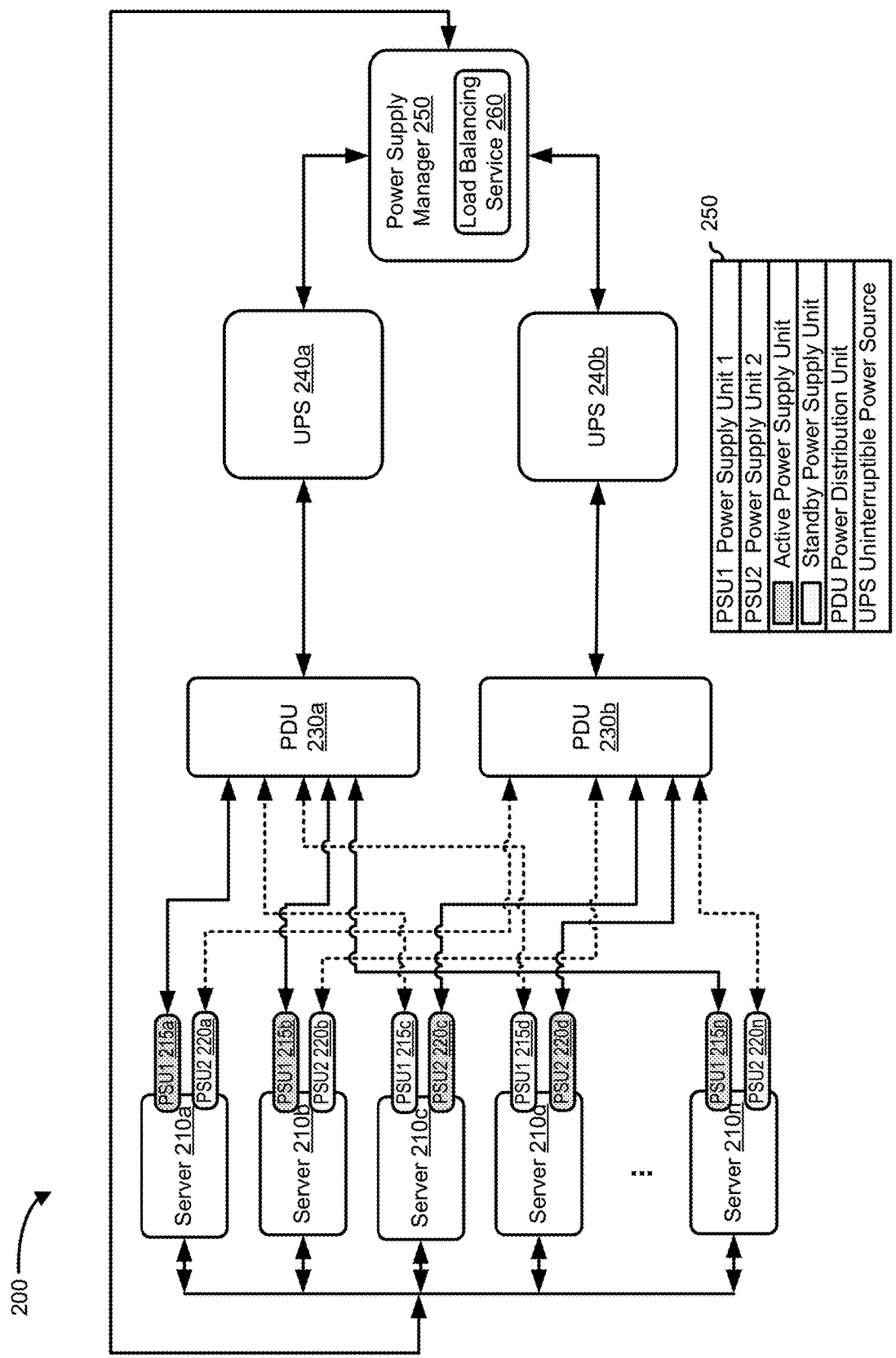
FIG. 2 is a block diagram illustrating an example of a system for dynamic load balancing across power supply units, according to an embodiment of the present disclosure.

FIG. 2 shows a power management system 200 for dynamic load balancing across power supply units. Power management system 200 includes server 210a-210n, PSU1 215a-215n, PSU2 220a-220n, power distribution unit (PDU) 230a-230b, UPS 240a-240b, and power supply manager 250 that includes a load balancing service 260. Power management system 200 may be configured to monitor and/or manage one or more UPS associated with server 210a-210n such as UPS 240a and UPS 240b. In addition, power management system 200 may be configured to monitor and/or manage power supply to server 210a-210 by PSU1 215a-215n and PSU2 220a-220n to ensure server reliability and uptime. The components of the power management system 200 may be implemented in hardware, software, firmware, or any combination thereof. The components shown are not drawn to scale and power management system 200 may include additional or fewer components. In addition, connections between components may be omitted for descriptive clarity.

Each one of server 210a-210n is similar to information handling system 100 of FIG. 1. To meet high availability requirements, servers may include more than one PSU such that, if one PSU fails, the remaining PSU(s) can provide enough power to continue server operation. A typical redundancy mode for servers may be where a single PSU in active mode can supply enough power for the server, while another PSU in standby mode is provided for redundancy. The PSUs may be configured to transition between the active mode and the standby mode or from the standby mode to the active move. The PSU may transition based on one or more factors such as a trigger, time period, according to a rule and/or an anomaly, etc. Here, each one of server 210a-210n includes two PSUs, wherein one PSU is in active mode and another PSU is in standby mode. For example, each one of PSU1 215a-215n is in active mode, while each of PSU2 220a-220n is in standby mode. In order to balance load on UPS 240a-240b, the PSUs in active mode and in standby mode are distributed across the PDUs and consequently across the UPS units, such that the UPS units supply power to similar number of PSUs in active mode and standby mode.

Power supply manager 250 may be an appliance or an application configured to communicate with available power sources of a cluster of the servers it manages to determine actual load distribution among the servers. Here, power supply manager 250 communicates with the power sources for server 210a-210n: UPS 240a-240b. During the communication with managed elements, power supply manager 250 includes a software service such as load balancing service 260 which may query or receive information associated with the managed elements. Power supply manager 250 may use the information to effectively perform load balancing of power through various PSUs. In this example, power supply manager 250 manages power for the managed elements: server 210a-210n, 210a-210n, PSU1 215a-215n, PSU2 220a-220n, PDU 230a-230b, and UPS 240a-240b.

Power supply manager 250 may be configured to monitor, control and/or communicate to the managed elements via a management controller similar to BMC 190 of FIG. 1. For example, power supply manager 250 may be configured to communicate with power sources to understand the actual load distribution of power in the cluster. Each of the managed elements may include an agent configured to respond to inquiries of power supply manager 250. Information received and/or gathered may be used for effective load balancing of power across the servers through different PSUs. Accordingly, power supply manager 250 may control the managed elements based on the information via the management controller.

Power supply manager 250 may use load balancing service 260 to communicate with the managed elements. Load balancing service 260 may use a web-based monitoring protocol such as WSMan or a network management protocol like Simple Network Management Protocol (SNMP) to manage and monitor the managed elements. Load balancing service 260 may use a UPS management information base (MIB) to view, get, extract, query, or retrieve information associated with the other managed elements such as UPS 240a-240b. Various standards such as a request for comments (RFC) 1628 may be used when retrieving information. The retrieved information may include characteristics that describe UPS 240a-240b such as electrical levels, battery status, active alarm count, estimated runtime, battery temperature, voltage input, voltage output, a current power state such as whether the UPS is online or offline, etc.

UPS 240a-2400b may be configured to provide monitoring information and to receive control information in accordance with one or more protocols such as SNMP protocol and WSMan protocol. For example, UPS 240a-240b can operate as SNMP-managed elements. The managed elements may include one or more management objects, such as upsOutputPercentLoad that are identified by a unique object identifier. The object identifier may define the monitoring and control parameters for the managed element. The object identifiers may be collected in the MIB that can be used by the power supply manager 250 or load balancing service 260 in particular to access monitoring and control parameters. The MIB is provided in a hierarchal structure and is accessed via an agent such as an SNMP or WSMan agent installed in the managed element. For example, based on the temperature, power demand or consumption of server 210a-210n, power source states or simply states of UPS 240a-240b, one or more of the PSUs, such as PSU1 215a-215n and PSU2 220a-220n, can be set to either active or standby mode by power supply manager 260 or load balancing service 260, in particular, to achieve a balanced power consumption across UPS 240a-240b.

During an initial setup, the PSUs may be configured with default PSU settings which may be if the load on the active PSU is more than fifty percent of the rated power wattage, then the standby PSU is transitioned to an active state. Also, if the load on the active PSU falls below twenty percent of the rated power wattage, then the standby PSU is transitioned to a sleep state. The default PSU settings may be updated by a user based on current power states of the UPS units. Additionally, given similar power states of UPS 240a-240b a similar number of PSU in active mode may be plugged into UPS 240a and UPS 240b so that the load of server 210a-210n may be balanced between the two UPS units.

Based on information and/or various factors associated with the managed elements, power supply manager 250 may perform one or more tasks to maintain and/or balance the power load between the UPS units. For example, power supply manager 250 may be configured to receive an alert a UPS unit has power utilization over a threshold and perform tasks accordingly. The tasks may include updating the status or mode of one or more PSUs to active or standby mode or vice versa.

Power supply manager 250 may enforce one or more rules in the performance of various tasks to manage, control, and/or monitor the managed elements. The tasks may also be performed periodically, such as every fifteen minutes, every thirty minutes, every hour, daily, weekly, monthly, etc. In addition, the aforementioned tasks may be performed based on a trigger such as when an anomaly in one or more of the UPS units is detected, an imbalance in power consumption across the UPS units, a shutdown of one or more of the UPS units, a particular difference between the power utilization percentages of the UPS units reaching or exceeding a threshold, etc. One or more of the object identifiers, such as upsAlarmGroup, upsBAtteryStatus, upsEstimatedMinutesRemaining, upsEstimatedChargeRemaining, etc. may be used to trigger and/or detect anomalies. The tasks may be performed in a round-robin fashion to achieve optimal use of the UPS units. Such may ensure that the usage of the UPS units is optimized.

For example, if the difference between power utilization percentages of UPS 240a and UPS 240b is less than or equal to a threshold, then no action is required. However, if the difference between the power utilization percentages between UPS 240a and UPS 240b is greater than the threshold, then a set of PSUs such as one or more of PSU1 215a-215n and PSU2 220a-220n may be swapped or transitioned from active mode to standby mode or vice versa. This would allow the difference between the power utilization percentages between UPS 240a and UPS 240b to go below or equal to the threshold. In another example, even if the difference between the power utilization percentages of UPS 240a and UPS 240b is less than the threshold, one or more of PSU1 215a-215n and PSU2 220a-220n may be swapped periodically from active mode to standby mode or vice versa to achieve optimal utilization of each of the UPS 240a-240b, PSU1 215a-215n, and PSU2 220a-220n.

The aforementioned may also be performed when a UPS unit exceeded its rated power wattage by a particular percentage or threshold. For example, if UPS 240a is detected to be operating at its maximum capacity of ninety five percent of its normal load, then one or more PSU units in active mode mapped to UPS 240a, such as PSU1 215a-215b may be transitioned to the standby mode. Accordingly, the PSU units in standby mode operating as redundant PSUs may be transitioned to the active mode in order for server 210a-210b avoid a power trip or failure.

Historical data associated with the power utilization and/or consumption associated with server 210a-210n, 210a-210n, PSU1 215a-215n, PSU2 220a-220n, PDU 230a-230b, and UPS 240a-240b may be stored and analyzed to determine various trends such as power utilization and/or power consumption. The trends may be used by an information technology specialist to make informed decisions such as whether to adjust one or more thresholds, triggers, alarms, etc. to effectively manage the power supply and/or balance the load.

PDU 230a and PDU 230b are configured to distribute power received from UPS 240a-240b to each one of server 210a-210n via PSU1 215a-215n and PSU2 220a-220n. PDU 230a-230b may be a managed PDU that can be remotely powered on, powered off, reboot one of server 210a-210n, and other network devices. Remote administrators can see into PDU activity and status from anywhere via secure web, SNMP, or telnet interfaces. For example, power supply manager 250 can reboot UPS 240a via PDU 230a.

Although the power management system 200 refers to servers, the embodiments of the present disclosure can be applied to other components such as storage servers, arrays, blades, and/or switches that include at least two PSUs. In addition, although FIG. 2 shows two PDUs and two UPS units, the present disclosure can be applied to a power management system with more than two PDUs and more than two UPS units.

Those of ordinary skill in the art will appreciate that the configuration, hardware, and/or software components of power management system 200 depicted in FIG. 2 may vary. For example, the illustrative components of power management system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
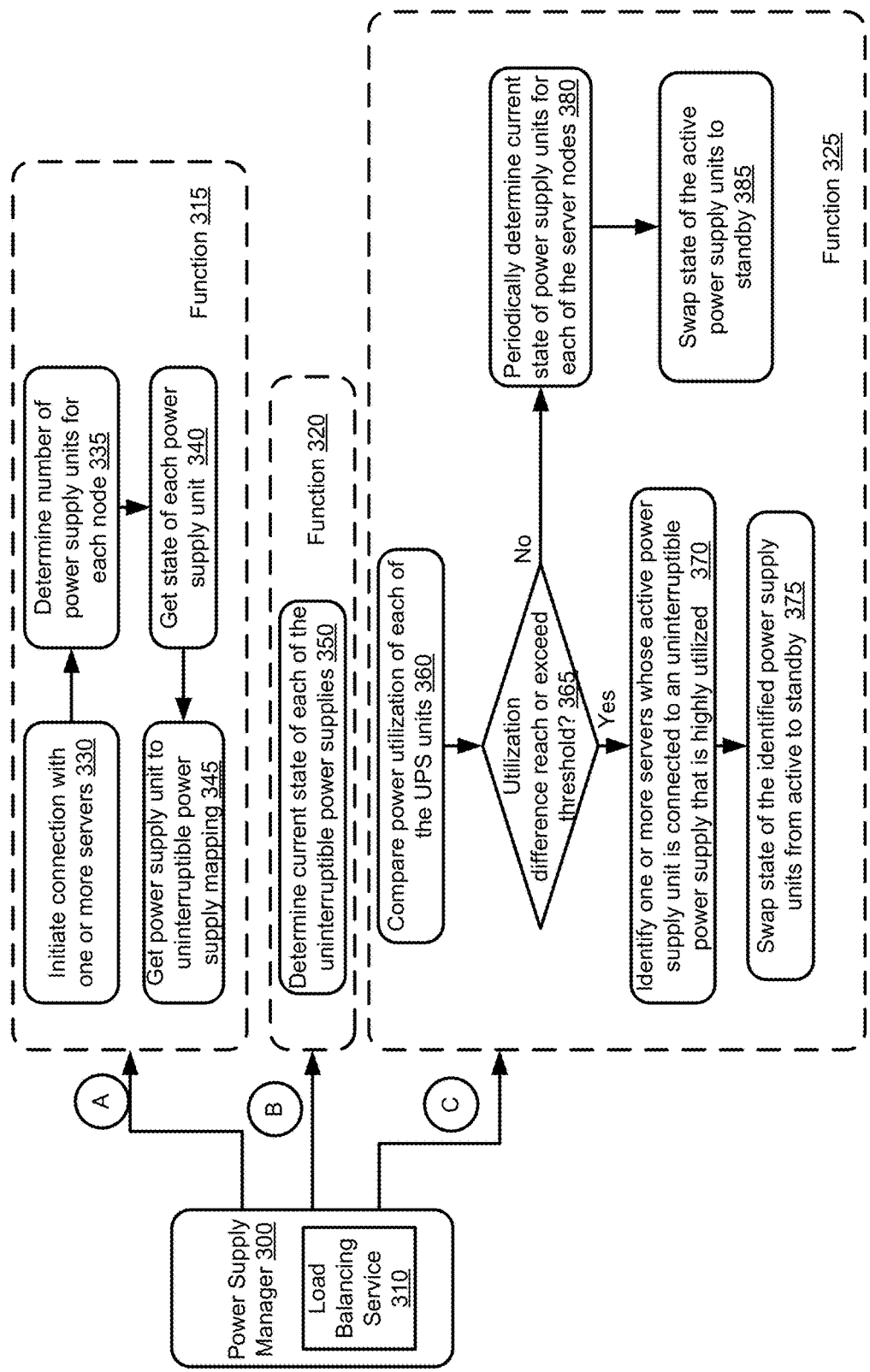
FIG. 3 is a block diagram illustrating an example of a power supply manager for dynamic load balancing across power supply units, according to an embodiment of the present disclosure.

FIG. 3 shows a power supply manager 300 for dynamic load balancing across power supply units. Power supply manager 300 includes a load balancing service 310. Power supply manager 300 may be configured to monitor and/or manage one or more UPS units. Power supply manager 300 may be implemented in hardware, software, firmware, or any combination thereof and may include additional components.

Power supply manager 300 which is similar to power manager 250 of FIG. 2 may be configured to balance power across two or more PSUs via the hot spare feature allowing a server to utilize equally all of the PSUs associated with it dynamically. In addition, as the power demand of the server varies based on its I/O load, CPU utilization, heat generation, etc. an imbalance in power utilization of the UPS units may occur and can even lead to power trips or failure. Accordingly, power supply manager 300 may also be configured to address these and other concerns.

FIG. 3 is annotated with a series of letters A-C. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations. Each of the stages may be performed by power supply manager 300 or load balancing service 310 in particular.

At stage A, power supply manager 300 may perform function 315 which includes blocks 330, 335, 340, and 345. At block 330, connection to one or more servers such as server 210a-210n of FIG. 2 may be initiated. After the connection is established, at block 335, the number of power supply units associated with each server may be determined. At block 340, the state of each PSU such as PSU1 215a-215n and PSU2 220a-220n may be determined. For example, power supply manager 300 may determine whether the PSU is powered on and in addition whether the PSU in the active mode or standby mode. At block 345, mapping of each of the PSU to UPS units may be performed.

At stage B, power supply manager 300 may perform function 320 which includes a block 350. At block 350, the current state of each of the UPS units, such as UPS 240a and UPS 240b may be determined. For example, power supply manager 250 may determine the power utilization of each of the UPS units.

At stage C, power supply manager 300 may perform function 325 which includes a decision block 365 and blocks 360, 370, 375, 380, and 385. At block 360, power supply manager 300 may compare the power utilization of each of the UPS units. In addition, the difference between the power utilization of each of the UPS units may be determined and compared to a power utilization threshold. At decision block 365, if the power utilization difference reaches or exceeds the power utilization threshold, then power supply manager 300 may proceed to block 370. Otherwise, then the power supply manager may proceed to block 380.

At block 370, power supply manager 300 may determine each server whose active PSU is connected to a UPS that is highly utilized or reaches or exceeds a threshold such as a power utilization threshold. In addition, the UPS may be deemed to be highly utilized if the difference between its power utilization and the power utilization of another UPS reaches or exceeds a threshold. At block 375, the state of the one or more PSUs identified in block 370 is transitioned from active mode to standby mode to achieve equal distribution of power utilization across the UPS units. At block 380, power supply manager 300 may periodically determine the current state of the PSU of each of the servers. Block 380 may be performed every thirty minutes, daily, weekly, monthly, every three months, etc. Then, at block 385, the power supply manager 300 swaps the state of the active PSU to standby. The power supply manager may swap the state of one or two sets of the PSUs or all of the PSUs periodically even if the power load is currently balanced. This is done so that the UPS units will be utilized equally.

Figure 4:
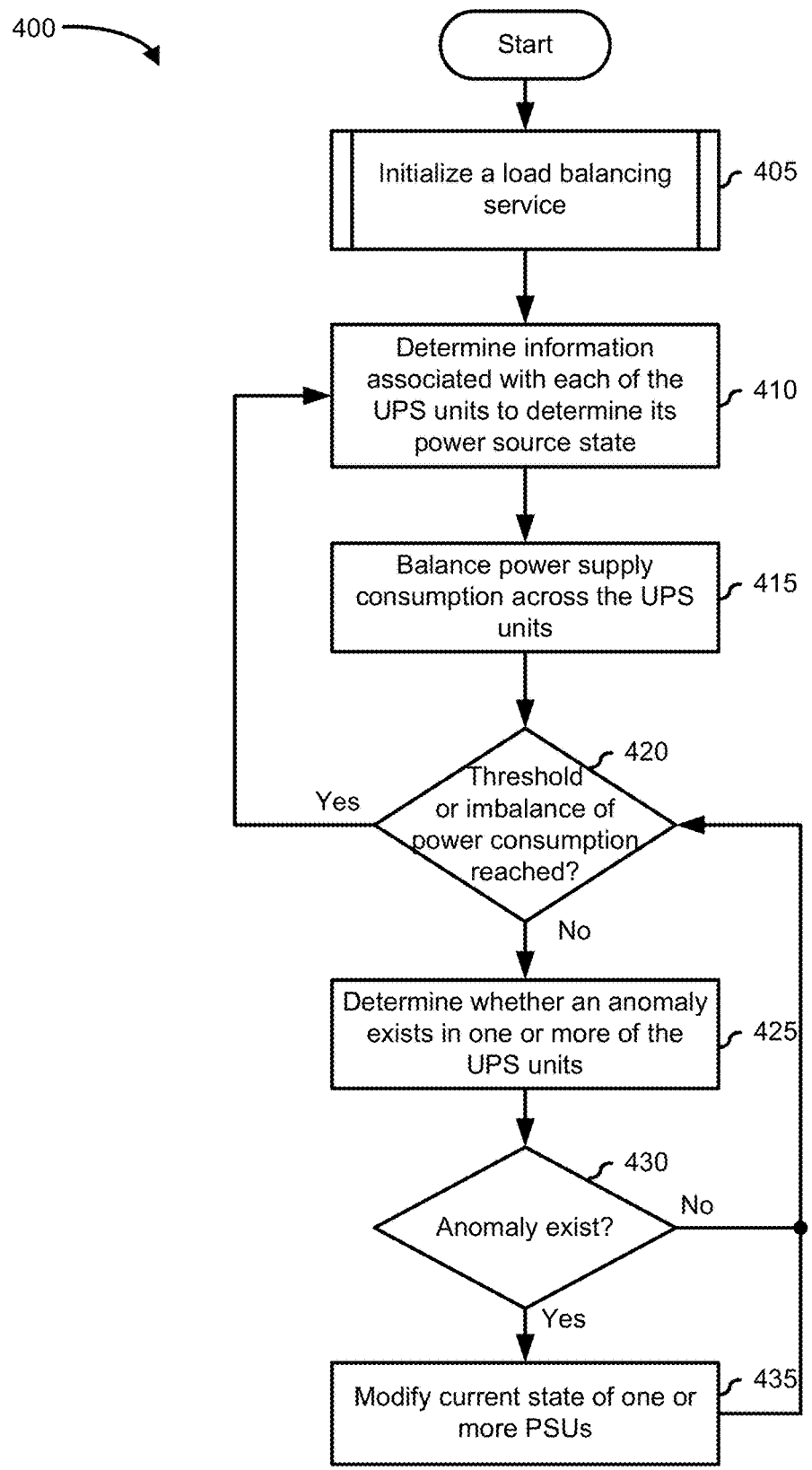
FIG. 4 is a flowchart illustrating an example of a method for dynamic load balancing across power supply units, according to an embodiment of the present disclosure.

FIG. 4 illustrates a method 400 for dynamic load balancing across PSUs. Method 400 can be performed by a power supply manager similar to power supply manager 250 and/or load balancing service similar to load balancing service 260 of FIG. 2. However, while embodiments of the present disclosure are described in terms of power management system 200 of FIG. 2, it should be recognized that other systems may be utilized to perform the described method. One of skill in the art will appreciate that this flowchart explains a typical example, which can be extended to advanced applications or services in practice.

Method 400 typically starts at block 405 where a load balancing service is created and/or initialized as a part of the power supply manager. After creating and/or initializing the load balancing service, the method determines information associated with each of the UPS units at block 410. The information may be used to determine the power source state of each UPS unit which may be used in balancing power supply consumption and/or power utilization across the UPS units at block 415. This balancing may be achieved by swapping the state of one or more PSUs from active to standby mode or vice versa. For example, the PSUs associated with a UPS unit that exceeds its power utilization rate or exceeds a temperature threshold may be transitioned to the standby mode.

At decision block 420, the load balancing service determines whether a threshold or an imbalance of the power utilization and/or consumption of the UPS units is reached or exceeded. If the threshold or the imbalance is reached and/or detected, then the "YES" branch is taken and the method proceeds to block 410. If the threshold or the imbalance is not reached and/or detected, then the "NO" branch is taken and the method proceeds to block 425 where the method determines whether an anomaly exists in one or more of the UPS units. The anomaly may be determined based on a trap received from the UPS units. For example, a trap onBattery may be received when a UPS unit is operating on battery power. On the other hand, a trap trapTestCompleted received may not be considered an anomaly.

At decision block 430 if an anomaly exists then the "YES" branch is taken and the method proceeds to block 435. Otherwise, if an anomaly does not exist then the "NO" branch is taken and the method proceeds to decision block 420. At block 435, the method modifies the current state of one or more PSUs. For example, assuming that a server includes a first PSU and a second PSU, where the first PSU is active and connected to a first UPS. The second PSU is on standby and connected to a second UPS. If the power supply manager received an anomaly associated with the first UPS, then the first PSU is transitioned to standby mode and the second PSU is transitioned to active mode. After modifying the current state of one or more PSUs, the method proceeds to decision block 420.

Figure 5:
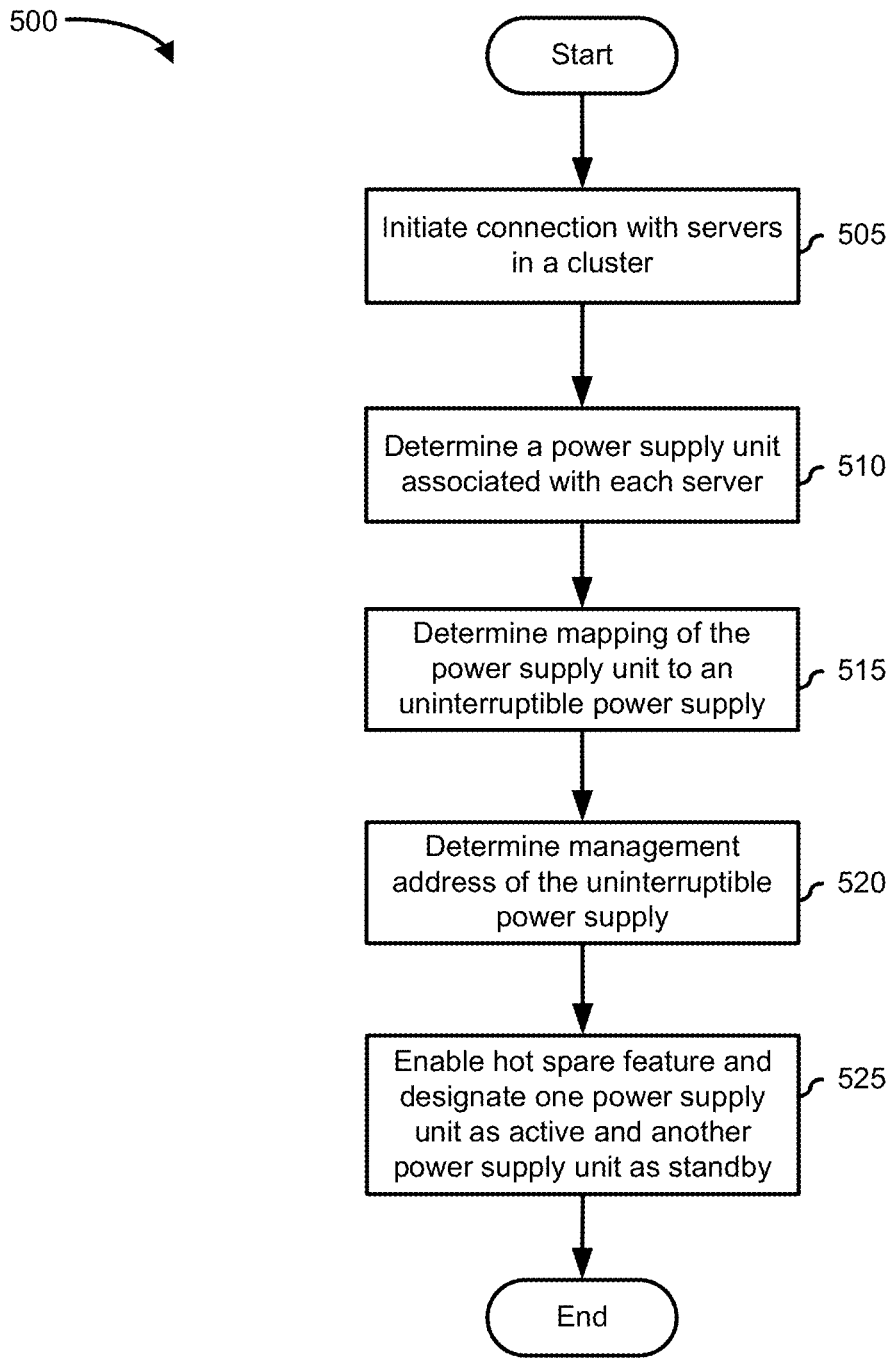
FIG. 5 is a flowchart illustrating a method for initializing a load balancing service for dynamic load balancing across power supply units, according to an embodiment of the present disclosure.

FIG. 5 illustrates a method 500 for initializing a load balancing service for dynamic load balancing across power supply units. Initialization of the load balancing service may be performed after its creation, a reboot of the power supply manager, or a request for re-initialization of the power supply manager, etc. Method 500 can be performed by a power supply manager similar to power supply manager 250 FIG. 2 or power supply manager 300 of FIG. 3. One or more blocks of method 500 can also be performed by the load balancing service similar to load balancing service 260 of FIG. 2 or load balancing service 310 of FIG. 3. However, while embodiments of the present disclosure are described in terms of power management system 200 of FIG. 2 or power supply manager 300 of FIG. 3, it should be recognized that other systems may be utilized to perform the described method. One of skill in the art will appreciate that this flowchart explains a typical example, which can be extended to advanced applications or services in practice.

Method 500 typically starts at block 505 where the power supply manager may initiate a connection with each server in a cluster of servers managed by the power supply manager. After connecting to each server, the power supply manager determines the one or more PSUs associated with each server at block 510. A server may be associated with two or more PSUs, where at least one PSU is in active mode and another PSU is in standby mode.

The method proceeds to block 515, where the mapping of the PSU to its associated UPS is determined. For example, the PSU in active mode is mapped to one UPS, while the PSU in standby mode is mapped to a second UPS. The method proceeds to block 515 where the management address of the UPS units is determined by querying the agent of the UPS units. The method proceeds to block 525 where the power supply manager enables the hot spare feature of each PSU allowing for redundancy. In addition, the method may designate one PSU as active and another PSU if available as standby.

Although FIG. 4, and FIG. 5 show example blocks of method 400 and method 500 in some implementation, method 400 and method 500 may include additional blocks, fewer blocks, different blocks, or differently arranged blocks than those depicted in FIG. 4 and FIG. 5. Additionally, or alternatively, two or more of the blocks of method 400 and method 500 may be performed in parallel. For example, decision block 420 and decision block 430 of method 400 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   retrieving, by a processor, information associated with a first power supply unit and a second power supply unit, wherein the first power supply unit and the second power supply unit are both associated with a server;
   determining a first power source state associated with a first uninterruptible power source and a second power source state associated with a second uninterruptible power source, wherein the first uninterruptible power source is associated with the first power supply unit and the second uninterruptible power source is associated with the second power supply unit;
   setting the first power supply unit in an active mode based on the first power source state, and the second power supply unit in a standby mode based on the second power source state;
   receiving an alert associated with one of the first power supply unit or the second power supply unit exceeding a power utilization threshold; and
   transitioning the first power supply unit from the active mode to the standby mode, and the second power supply unit from the standby mode to the active mode, based on the alert associated with exceeding the power utilization threshold.

2. The method of claim 1, wherein the information associated with the first power supply unit and the second power supply unit includes a mapping of the first power supply unit to the first uninterruptible power source and the second power supply unit to the second uninterruptible power source.

3. The method of claim 1, further comprising determining power supply units associated with the server.

4. The method of claim 1, wherein the determining the first power source state and the second power source state are performed using management information base.

5. The method of claim 1, wherein the determining of the first power source state and the second power source state are performed periodically.

6. The method of claim 1, further comprising mapping the first power supply unit to the first uninterruptible power source and the second power supply unit to the second uninterruptible power source.

7. The method of claim 1, further comprising transitioning a first set of power supply units in the active mode to the standby mode and a second set of power supply units in the standby mode to the active mode periodically.

8. A power supply management system, comprising:
   a power supply controller configured to manage power utilization of a first uninterruptible power source and a second uninterruptible power source, wherein the power supply controller includes a load balancing controller; and
   the load balancing controller configured to:
      retrieve information that is associated with a first power supply unit and a second power supply unit, wherein the first power supply unit and the second power supply unit are both associated with a server;
      determine a first power source state associated with the first uninterruptible power source and a second power source state associated with the second uninterruptible power source, wherein the first uninterruptible power source is associated with the first power supply unit and the second uninterruptible power source is associated with the second power supply unit;
      set the first power supply unit in an active mode based on the first power source state and the second power supply unit in a standby mode based on the second power source state;
      receive an alert associated with one of the first power supply unit or the second power supply unit exceeding a temperature threshold; and
      transition the first power supply unit from the active mode to the standby mode and the second power supply unit from the standby mode to the active mode based on the alert associated with exceeding the temperature threshold.

9. The power supply management system of claim 8, further comprising periodically transitioning a first set of power supply units in the active mode to the standby mode and a second set of power supply units in the standby mode to the active mode.

10. The power supply management system of claim 8, further comprising determining power supply units associated with the server.

11. The power supply management system of claim 8, wherein determination of the first power source state and the second power source state are performed by querying a first agent of the first uninterruptible power source and a second agent of the second uninterruptible power source respectively.

12. The power supply management system of claim 8, further comprising mapping the first power supply unit to the first uninterruptible power source and the second power supply unit to the second uninterruptible power source.

13. The power supply management system of claim 8, wherein determination of the first power source state and the second power source state are performed periodically.

14. A non-transitory computer-readable medium including code that when executed causes a processor to perform a method, the method comprising:
retrieving information that is associated with a first power supply unit and a second power supply unit, wherein the first power supply unit and the second power supply unit are both associated with a server;
determining a first power source state associated with a first uninterruptible power source and a second power source state associated with a second uninterruptible power source, wherein the first uninterruptible power source is associated with the first power supply unit and the second uninterruptible power source is associated with the second power supply unit;
setting the first power supply unit in an active mode based on the first power source state, and the second power supply unit in a standby mode based on the second power source state;
receiving an alert associated with one of the first power supply unit or the second power supply unit exceeding a power utilization threshold; and
transitioning the first power supply unit from the active mode to the standby mode and the second power supply unit from the standby mode to the active mode based on the alert associated with exceeding the power utilization threshold.

15. The non-transitory computer-readable medium of claim 14, the method further comprising transitioning a first set of power supply units in the active mode to the standby mode and a second set of power supply units in the standby mode to the active mode periodically.

16. The non-transitory computer-readable medium of claim 14, the method further comprising determining power supply units associated with the server.

17. The non-transitory computer-readable medium of claim 14, the method further comprising mapping the first power supply unit to the first uninterruptible power source and the second power supply unit to the second uninterruptible power source.

18. The non-transitory computer-readable medium of claim 14, wherein the determining the first power source state and the second power source state are performed by querying a first agent of the first uninterruptible power source and a second agent of the second uninterruptible power source.

19. The non-transitory computer-readable medium of claim 14, wherein the determining the first power source state and the second power source state are performed periodically.

20. The non-transitory computer-readable medium of claim 14, the method further comprising periodically transitioning a first set of power supply units in the active mode to the standby mode and a second set of power supply units in the standby mode to the active mode.

* * * * *